United States Patent
Ugurlu et al.

(10) Patent No.: US 10,694,438 B2
(45) Date of Patent: Jun. 23, 2020

(54) REUSE OF MOBILITY REFERENCE SIGNALS TO PERFORM RADIO LINK MONITORING IN A BEAM-BASED SYSTEM

(71) Applicant: Telefonaktiebolaget LM Ericsson (publ), Stockholm (SE)

(72) Inventors: Umut Ugurlu, Cambridge (GB); Icaro L. J. da Silva, Solna (SE); Rui Fan, Beijing (CN); Pradeepa Ramachandra, Linköping (SE); Claes Tidestav, Bålsta (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 223 days.

(21) Appl. No.: 15/743,525

(22) PCT Filed: Nov. 3, 2017

(86) PCT No.: PCT/SE2017/051100
§ 371 (c)(1),
(2) Date: Jan. 10, 2018

(87) PCT Pub. No.: WO2018/084798
PCT Pub. Date: May 11, 2018

(65) Prior Publication Data
US 2019/0380075 A1     Dec. 12, 2019

Related U.S. Application Data

(63) Continuation of application No. PCT/CN2016/104755, filed on Nov. 4, 2016.

(51) Int. Cl.
*H04W 36/06* (2009.01)
*H04W 36/00* (2009.01)
(Continued)

(52) U.S. Cl.
CPC ....... *H04W 36/06* (2013.01); *H04W 36/0085* (2018.08); *H04W 72/046* (2013.01); *H04W 72/085* (2013.01)

(58) Field of Classification Search
CPC . H04W 36/06; H04W 72/046; H04W 72/085; H04W 36/0085
See application file for complete search history.

(56) References Cited

U.S. PATENT DOCUMENTS 10,420,091 B2    9/2019    Feng et al.
10,425,951 B2*   9/2019    Mildh ................. H04W 72/046
(Continued)

FOREIGN PATENT DOCUMENTS

EP    2869478 A1    5/2015
RU    2518405 C2    6/2014
(Continued)

OTHER PUBLICATIONS

Unknown, Author, "Operation in higher frequencies", Ericsson, 3GPP TSG-RAN WG2 #94, R2-163995, Nanjing, P.R. China, 1-4, May 23-27, 2016, 1-4.
(Continued)

*Primary Examiner* — Afshawn M Towfighi
(74) *Attorney, Agent, or Firm* — Murphy, Bilak & Homiller, PLLC

(57) ABSTRACT

An access node configures a user equipment, UE, to perform mobility management measurements using at least a first subset of beam-formed reference signals and to perform radio link monitoring, RLM, using at least some of the first subset of beam-formed reference signals used for the mobility management measurements. The access node transmits, in a first downlink signal having a series of subframes, a beam-formed reference signal in each of a plurality of subframes, where the beam-formed reference signals are
(Continued)

transmitted in fewer than all of the subframes of the downlink signal. The UE receives, in the beam-formed downlink signal, the beam-formed reference signal in each of the plurality of subframes. The UE performs mobility management measurements using at least a first subset of the received beam-formed reference signals and performs RLM using at least some of the first subset of beam-formed reference signals used for the mobility management measurements.

21 Claims, 14 Drawing Sheets

(51) Int. Cl.
*H04W 72/04* (2009.01)
*H04W 72/08* (2009.01)

(56) References Cited

U.S. PATENT DOCUMENTS

| | | | |
|---|---|---|---|
| 2012/0182895 A1* | 7/2012 | Jwa | H04W 72/046 370/252 |
| 2013/0059610 A1 | 3/2013 | Siomina et al. | |
| 2013/0301542 A1 | 11/2013 | Krishnamurthy et al. | |
| 2014/0146863 A1 | 5/2014 | Seol et al. | |
| 2014/0204825 A1 | 7/2014 | Ekpenyong et al. | |
| 2014/0269368 A1 | 9/2014 | Xu et al. | |
| 2015/0296487 A1 | 10/2015 | Takeda et al. | |
| 2016/0006549 A1 | 1/2016 | Kim et al. | |
| 2016/0249269 A1 | 8/2016 | Niu et al. | |
| 2017/0033904 A1 | 2/2017 | Stirling-Gallacher et al. | |
| 2017/0150384 A1* | 5/2017 | Rune | H04W 36/0088 |
| 2017/0208494 A1 | 7/2017 | Moon et al. | |
| 2017/0325244 A1 | 11/2017 | Zhang et al. | |
| 2017/0332371 A1* | 11/2017 | Kubota | H04B 7/0621 |
| 2017/0339704 A1 | 11/2017 | Matsumoto et al. | |
| 2018/0049204 A1 | 2/2018 | Nory et al. | |
| 2018/0084446 A1 | 3/2018 | Li et al. | |
| 2018/0092054 A1 | 3/2018 | Azarian Yazdi et al. | |
| 2018/0309495 A1* | 10/2018 | Xiong | H04J 11/00 |
| 2018/0310283 A1 | 10/2018 | Deenoo et al. | |
| 2018/0376359 A9 | 12/2018 | Kim et al. | |
| 2020/0083994 A1 | 3/2020 | Marinier et al. | |

FOREIGN PATENT DOCUMENTS

| | | |
|---|---|---|
| RU | 2593394 C1 | 8/2016 |
| WO | 2013173023 A1 | 11/2013 |

OTHER PUBLICATIONS

3GPP, "3rd Generation Partnership Project; Technical Specification Group Radio Access Network; Evolved Universal Terrestrial Radio Access (E-UTRA); Physical layer procedures (Release 14)", 3GPP TS 36.213 V14.0.0, Sep. 2016, 1-406.
3GPP, "3rd Generation Partnership Project; Technical Specification Group Radio Access Network; Evolved Universal Terrestrial Radio Access (E-UTRA); User Equipment (UE) conformance specification Radio transmission and reception Part 1: Conformance Testing; (Releas", 3GPP TS 36.521-1 V14.0.0, Sep. 2016, 1-3733.
Unknown, Author, "New SID Proposal: Study on New Radio Access Technology", 3GPP TSG RAN Meeting #71, RP-160671, Goteborg, NTT DOCOMO, Mar. 7-10, 2016, 1-18.
Unknown, Author, "Beam-based aspects for New Radio", InterDigital Communications, 3GPP TSG-RAN \VG2 #95-BIS, R2-167137, Kaohsiuug, Taiwan, Oct. 10-14, 2016, 1-4.
Unknown, Author, "Future proofness and energy efficiency", Ericsson, 3GPP TSG-RAN WG2 #94, R2-163994, Nanjing, P.R. China, May 23-27, 2016, 1-4.
Unknown, Author, "Mobility based on DL and UL measurements", Ericsson, 3GPP TSG-RAN WG2 #94, R2-163999, Nanjing, China, May 23-27, 2016, 1-3.
Unknown, Author, "Mobility execution in NR", Ericsson, 3GPP TSG-RAN WG2 #94, R2-164000, Nanjing, China, May 23-27, 2016, 1-2.
Unknown, Author, "Mobility measurements and procedures", Ericsson, 3GPP TSG-RAN WG2 #94, R2-164001, Nanjing, P.R. China, May 23-27, 2016, 1-5.
Unknown, Author, "Network controlled Mobility for NR", Ericsson, 3GPP TSG-RAN WG2 #94, R2-164002, Nanjing, P.R. China, May 23-27, 2016, 1-2.

* cited by examiner

REUSE OF MOBILITY REFERENCE SIGNALS TO PERFORM RADIO LINK MONITORING IN A BEAM-BASED SYSTEM

TECHNICAL BACKGROUND

The present disclosure is generally related to wireless communications systems, and is more particularly related to radio link monitoring (RLM) in such systems.

BACKGROUND

Radio Link Monitoring (RLM) in LTE

The Long-Term Evolution (LTE) wireless system developed by the $3^{rd}$-Generation Partnership Project (3GPP) is a widely deployed fourth-generation wireless communications system. In LTE and its predecessor systems, the purpose of the RLM function in a wireless device, referred to in 3GPP documentation as a "user equipment," or "UE," is to monitor the downlink radio link quality of the serving cell in RRC_CONNECTED mode. This monitoring is based on Cell-Specific Reference Signals (CRS), which are always associated to a given LTE cell and are derived from the Physical Cell Identifier (PCI). RLM in turn enables the UE, when in RRC_CONNECTED mode, to determine whether it is in-sync or out-of-sync with respect to its serving cell, as described in 3GPP TS 36.213, v14.0.0.

The UE's estimate of the downlink radio link quality, based on its measurements of the CRS, is compared with out-of-sync and in-sync thresholds, Qout and Qin respectively, for the purposes of RLM. These thresholds are standardized in terms of the Block Error Rate (BLER) of a hypothetical Physical Downlink Control Channel (PDCCH) transmission from the serving cell. Specifically, Qout corresponds to a 10% BLER, while Qin corresponds to a 2% BLER, The same threshold levels are applicable whether Discontinuous Reception (DRX) is in use or not.

The mapping between the CRS-based downlink quality and the hypothetical PDCCH BLER is up to the UE implementation. However, the performance is verified by conformance tests defined for various environments, as described in 3GPP TS 36.521-1, v14.0.0. Also, the downlink quality is calculated based on the Reference Signal Receive Power (RSRP) of CRS over the whole band, as illustrated in FIG. 1, since PDCCH is transmitted over the whole band.

When no DRX is configured, out-of-sync occurs when the downlink radio link quality estimated over the last 200-millisecond period becomes worse than the threshold Qout. Similarly, without DRX, the in-sync occurs when the downlink radio link quality estimated over the last 100-millisecond period becomes better than the threshold Qin. Upon detection of out-of-sync, the UE initiates the evaluation of in-sync. The occurrences of out-of-sync and in-sync are reported internally by the UE's physical layer to its higher layers, which in turn may apply layer 3 (i.e., higher layer) filtering for the evaluation of Radio Link Failure (RLF). The higher-layer RLM procedure is illustrated in FIG. 2.

When DRX is in use, the out-of-sync and in-sync evaluation periods are extended, to enable sufficient UE power saving, and depend upon the configured DRX cycle length. The UE starts in-sync evaluation whenever out-of-sync occurs. Therefore, the same period (TEvaluate_Qout_DRX) is used for the evaluation of out-of-sync and in-sync. However, upon starting the RLF timer (T310) until its expiry, the in-sync evaluation period is shortened to 100 milliseconds, which is the same as without DRX. If the timer T310 is stopped due to N311 consecutive in-sync indications, the UE performs in-sync evaluation according to the DRX based period (TEvaluate_Qout_DRX).

The whole methodology used for RLM in LTE (i.e., measuring the CRS to "estimate" the PDCCH quality) relies on the assumption that the UE is connected to an LTE cell, a single connectivity entity transmitting both PDCCH and CRSs.

5G Development

In a study item for the new 5G radio access technology, entitled New Radio (NR), companies have reached initial agreements on the following design principles; ultra-lean design for NR; and massive usage of beamforming.

Companies have expressed the view that beamforming should be taken into account when RLM is designed, which is not the case in LTE, In addition, concerns have been expressed regarding how the UE should measure the quality of a cell.

Following are some of the principles of NR that may drive the need for new solutions for RLM, compared to the existing solution in LTE. Also described are some aspects of the beam-based mobility solution for NR using RRC signaling across transmission receiving points (TRPs) that are unsynchronized and/or not sharing the same baseband and/or linked via non-ideal backhaul.

Ultra-Lean Design in 5G NR

NR is expected to be an ultra-lean system, which implies a minimization of always-on transmissions, aiming for an energy efficient future-proof system. Early agreements in 3GPP show that this principle has been endorsed and there is a common understanding that NR should be a lean system. In RAN1#84bis, RAN1 agreed, regarding ultra-lean design, that NR shall strive for maximizing the amount of time and frequency resources that can be flexibly utilized or left blanked, without causing backward compatibility issues in the future. Blank resources can be used for future use. NR shall also strive for minimizing transmission of always-on signals and confining signals and channels for physical layer functionalities (signals, channels, signaling) within a configurable/allocable time/frequency resource.

Beamforming in 5G NR

There is a common understanding that NR will consider frequency ranges up to 100 GHz. In comparison to the current frequency bands allocated to LTE, some of the new bands will have much more challenging propagation properties such as lower diffraction and higher outdoor/indoor penetration losses. Consequently, signals will have less ability to propagate around corners and penetrate walls. In addition, in high frequency bands, atmospheric/rain attenuation and higher body losses render the coverage of NR signals even spottier. Fortunately, operation in higher frequencies makes it possible to use smaller antenna elements, which enables antenna arrays with many antenna elements. Such antenna arrays facilitate beamforming, where multiple antenna elements are used to form narrow beams and thereby compensate for the challenging propagation properties. For these reasons, it is widely accepted that NR will rely on beamforming to provide coverage, which means that NR is often referred to as a beam-based system.

It is also known that different antenna architectures should be supported in NR: analog, hybrid and digital. This implies some limitations in terms of how many directions can be covered simultaneously, especially in the case of analog/hybrid beamforming. To find a good beam direction at a given transmission point (TRP)/access node/antenna array, a beam-sweep procedure is typically employed. A typical example of a beam-sweep procedure is that the node points a beam containing a synchronization signal and/or a beam identification signal, in each of several possible directions, one or few direction(s) at a time. This is illustrated in FIG. 3, where each of the illustrated lobes represents a beam, and where the beams may be transmitted consecutively, in a sweeping fashion, or at the same time, or in some combination. If the same coverage properties apply to both a synchronization signal and beam identification signal in each beam, the UE can not only synchronize to a TRP but also gain the best beam knowledge at a given location.

As described above, common signals and channels in LTE are transmitted in an omnidirectional manner, i.e., without beamforming. In NR, with the availability of many antennas at the base station and the different ways they can be combined to beamform signals and channels, that assumption, as made in LTE, may no longer be valid. The major consequence of that design principle of NR beamforming is that while in LTE it was quite clear that the CRSs quality could be used to estimate the quality of PDCCH, in NR this becomes unclear, due to the different ways channels and reference signals can be beamformed. In other words, it cannot be assumed as a general matter that any particular reference signal will be transmitted in the same manner as the PDCCH is transmitted. This ambiguity from the UE's point of view is due to the fact that reference signals and channels can be transmitted by the network via different kinds of beamforming schemes, which are typically determined based on real-time network requirements. These requirements may include, for example, different tolerance levels to radio overhead due to reference signals versus control channels, or different coverage requirements for reference signals versus control channels.

Despite these challenges from NR design principles, an NR UE in connected mode still needs to perform RLM, to verify whether its cell quality is still good enough, so that the UE can be reached by the network. Otherwise, higher layers should be notified, and UE autonomous actions should be triggered.

Mobility Reference Signal in NR: 3GPP Agreements

In 3GPP discussions, certain aspects have been agreed to for mobility reference signals (MRSs), which are used by the UE in NR for measurements related to mobility (e.g., handover, or HO). For downlink-based mobility in RRC_CONNECTED mode involving radio resource control (RRC) and beams, the UE measures at least one or more individual beams, and the gNB (3GPP terminology for an NR base station) should have mechanisms to consider those beams to perform HO. This is necessary at least to trigger inter-gNB handovers and to avoid HO ping-pongs/HO failures. It is to be determined whether UEs will report individual and/or combined quality of multiple beams. The UE should also be able to distinguish between the beams from its serving cell and beams from non-serving cells for Radio Resource Management (RRM) measurements in active mobility. The UE should be able to determine whether a beam is from its serving cell. It is yet to be determined whether serving/non-serving cell may be termed "serving/non-serving set of beams," whether the UE is informed via dedicated signalling or implicitly detected by the UE based on some broadcast signals, how the cell in connected relates to the cell in idle, and how to derive a cell quality based on measurements from individual beams.

Multiple solutions for the specific design of the MRS are being considered, but in any of these, the UE performs RRM measurements within its serving cell via a set of MRSs. The UE is aware of the specific MRS that belongs to its serving cell, so that all other reference signals the UE may detect are assumed to be neighbors.

The transmission strategy for reference signals like MRSs can utilize the freedom in time and/or frequency and/or the code/sequence dimension. By transmitting the reference signals for different beams in orthogonal resources, the network can obtain distinct measurement reports corresponding to these signals from the UE corresponding to the orthogonal reference signals.

SUMMARY

As described above, RLM in LTE is based on CRSs, where a wide-band signal is transmitted in all subframes. A major consequence of the lean-design principle with respect to the RLM design in NR is that there is a wish to avoid the design of wide-band signals transmitted in all subframes. Therefore, lean design will prohibit the usage of the same LTE solution for RLM in NR.

Described in detail below are techniques by which a wireless device (e.g., UE) can measure its serving cell quality where a cell is transmitting signals in a beamforming manner in a lean design, i.e., without always-on reference signals transmitted in the whole band and across all subframes.

Embodiments of the present techniques include methods at a UE and a network radio access node, where the UE performs RLM in a system with beamforming by performing RRM measurements based on the same periodic reference signals configured to support connected mode mobility (MRS). At the network side, the radio access node transmits downlink control channel information (e.g., in a PDCCH) in the same way it transmits these reference signals that are reused for RLM purposes, in some embodiments.

In the context of the present disclosure, "performing RLM" means performing RRM measurements and comparing the value of a given metric, e.g., a signal-to-interference-plus-noise ratio (SINR), with a threshold that represents the downlink control channel quality under the assumption that the control channel would have been transmitted in the same manner. i.e., with similar beamforming properties and/or similar or representative frequency resources.

Advantages of the embodiments may include the network being able to ensure that UEs can make accurate RLM measurements over a large range of time-frequency resources, without introducing a dedicated and static/always-on periodic reference signal (RS) in the network. Advantages may also include being able to maintain signaling overhead at a low level, without compromising the accuracy of RLM measurements, especially during data inactivity.

The control channel can be transmitted on a narrow UE-specific beam, for improved coverage at high carrier frequencies. The disclosed techniques may be used to ensure that the RLM function can be maintained reliably for such control channel design, without falling back to a wider beam.

According to some embodiments, a method in a UE includes receiving, in a downlink signal having a series of subframes, a beam-formed reference signal in each of a plurality of subframes, where the beam-formed reference signals are received in fewer than all of the subframes of the downlink signal. The method also includes performing mobility management measurements using at least a first subset of the received beam-formed reference signals, and performing RLM using at least some of the same beam-formed reference signals used for the mobility management measurements, i.e., using at least some of the first subset of the received beam-formed reference signals. In some embodiments, the downlink signal may include one or more control channels that are beam-formed in the same manner as the beam-formed reference signals.

According to some embodiments, a method in an access node of a wireless communications system includes transmitting, in a first downlink signal having a series of subframes, a beam-formed reference signal in each of a plurality of subframes, where the beam-formed reference signals are transmitted in fewer than all of the subframes of the downlink signal. The method also includes configuring a UE to perform mobility management measurements using at least a first subset of the beam-formed reference signals and to perform radio link monitoring, RLM, using at least some of the first subset of beam-formed reference signals used for the mobility management measurements. The configuring may be performed prior to the transmitting, for example. In some embodiments, the transmitting includes transmitting a first control channel using the same beamforming parameters used to transmit the beam-formed reference signals.

According to some embodiments, a UE configured for operation in a wireless communication network includes transceiver circuitry and processing circuitry operatively associated with the transceiver circuitry. The processing circuitry is configured to receive, in a downlink signal having a series of subframes, a beam-formed reference signal in each of a plurality of subframes, where the beam-formed reference signals are received in fewer than all of the subframes of the downlink signal. The processing circuitry is also configured to perform mobility management measurements using at least a first subset of the received beam-formed reference signals and perform RLM using at least some of the first subset of beam-formed reference signals used for the mobility management measurements.

According to some embodiments, an access node of a wireless communications system includes transceiver circuitry and processing circuitry operatively associated with the transceiver circuitry. The processing circuitry is configured to transmit, in a first downlink signal having a series of subframes, a beam-formed reference signal in each of a plurality of subframes, where the beam-formed reference signals are transmitted in fewer than all of the subframes of the downlink signal. The processing circuit is configured to configure a UE to perform mobility management measurements using at least a first subset of the beam-formed reference signals and to perform radio link monitoring, RLM, using at least some of the first subset of beam-formed reference signals used for the mobility management measurements. In some embodiments, the processing circuit is further configured to transmit a first control channel using the same beamforming parameters used to transmit the beam-formed reference signals.

Further aspects of the present invention are directed to an apparatus, computer program products or computer readable storage medium corresponding to the methods summarized above and functional implementations of the above-summarized apparatus and UE.

Of course, the present invention is not limited to the above features and advantages. Those of ordinary skill in the art will recognize additional features and advantages upon reading the following detailed description, and upon viewing the accompanying drawings.

DETAILED DESCRIPTION

In the following, concepts in accordance with exemplary embodiments of the invention will be explained in more detail and with reference to the accompanying drawings. The illustrated embodiments relate to radio link monitoring in such a wireless communication network, as performed by wireless devices, in the following also referred to as UEs, and access nodes. The wireless communication network may for example be based on a 5G radio access technology (RAT), such as an evolution of the LTE RAT or the 3GPP New Radio (NR). However, it is to be understood that the illustrated concepts could also be applied to other RATs.

Related to some embodiments of the presently disclosed techniques is how the network guarantees the correlation of the quality of the serving cell MRS(s) and the quality of the downlink control channel(s). This is done at the network side by beamforming the downlink control channel information with the same beamforming configuration (e.g., direction, beam width, power distribution, same antenna panel, etc.) used for transmitting the MRSs configured for that UE. Note that as used herein, the terms "MRS" and "mobility reference signal" are used to refer to reference signals configured to and/or used to support connected mode mobility, i.e., for measurement by UEs to determine when handovers to other beams and/or cells. It will be appreciated that some or all of these reference signals may be used for other purposes as well, and these reference signals may be known by other names.

For the MRSs transmitted in one or several beams, different embodiments can define the information the signal carries, e.g., in terms of the identifiers, in various ways. In some embodiments, for example, different RSs are transmitted in each beam, and each one carries its own beam identifier (BID). In this case, the reference signals can be called beam-specific RS (BRS), and the UE can perform RLM on a per-beam basis, i.e., measuring an RSRP per individual beam that is equivalent to the quality of the transmission of the downlink control channel in that specific beam. In other embodiments, the same RSs may be transmitted in each of the beams, where each one carries the same identifier. This identifier can either be a BID, a group identifier that can be a cell identifier Cell ID (CID) or both a beam ID+cell ID. In these embodiments, the UE may distinguish beams in the time domain, and/or simply perform some averaging over beams carrying the same identifier.

Figure 1:
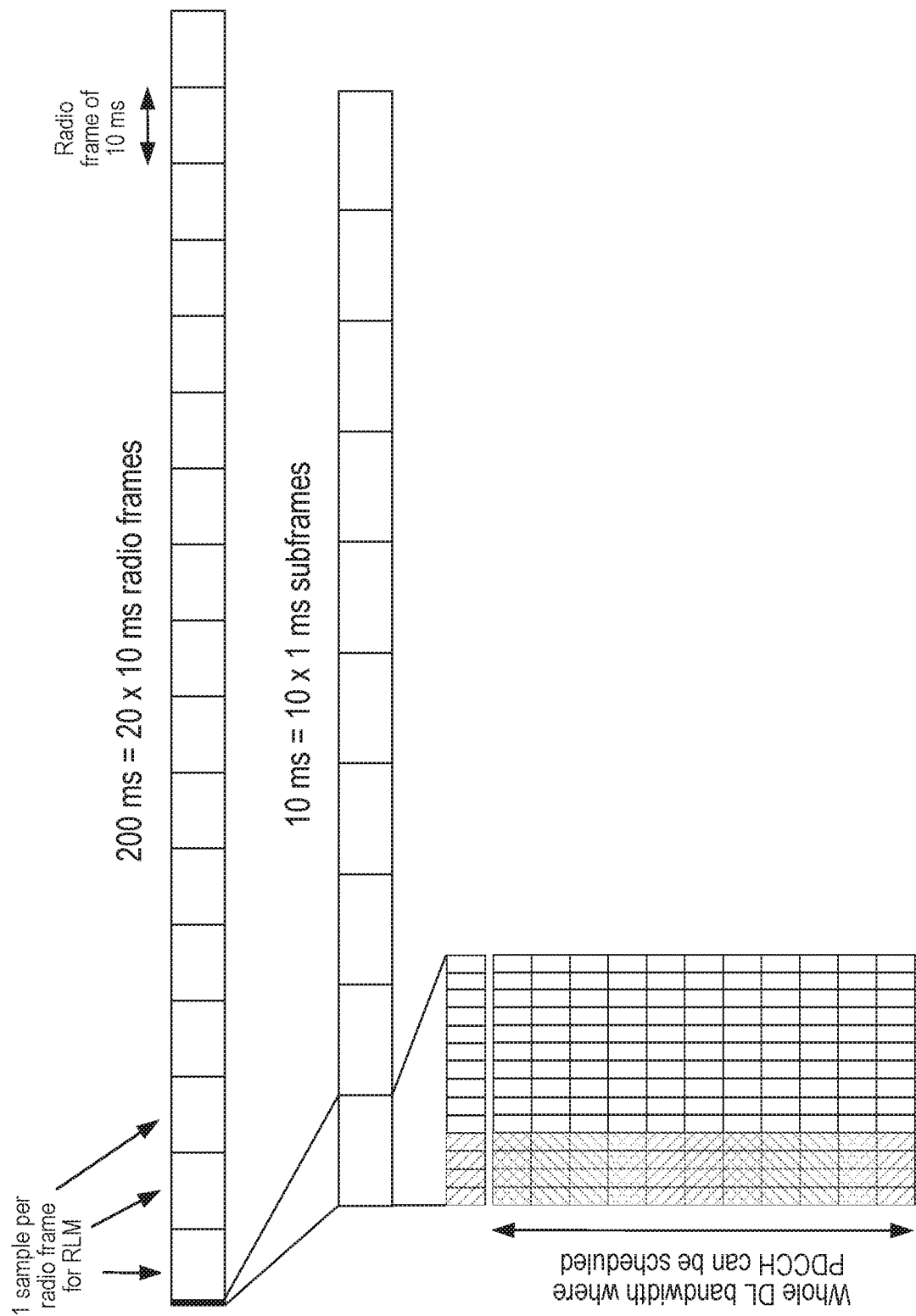
FIG. 1 illustrates how PDCCH can be scheduled anywhere over the whole downlink transmission bandwidth.
Figure 2:
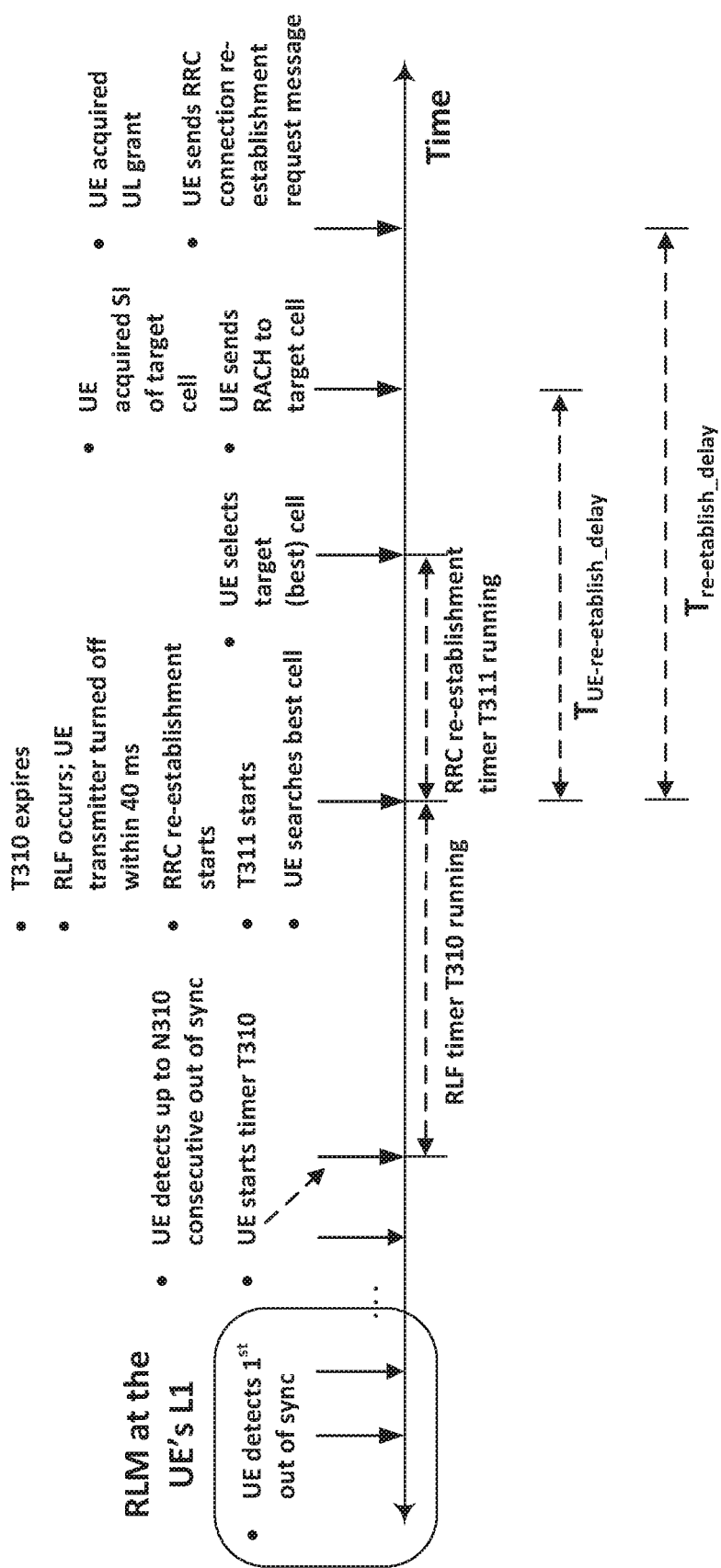
FIG. 2 illustrates higher layer RLM procedures in LTE.
Figure 3:
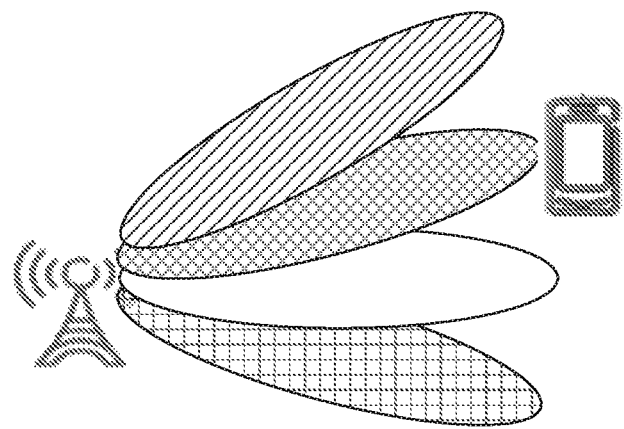
FIG. 3 illustrates a beam sweeping procedure.
Figure 4:
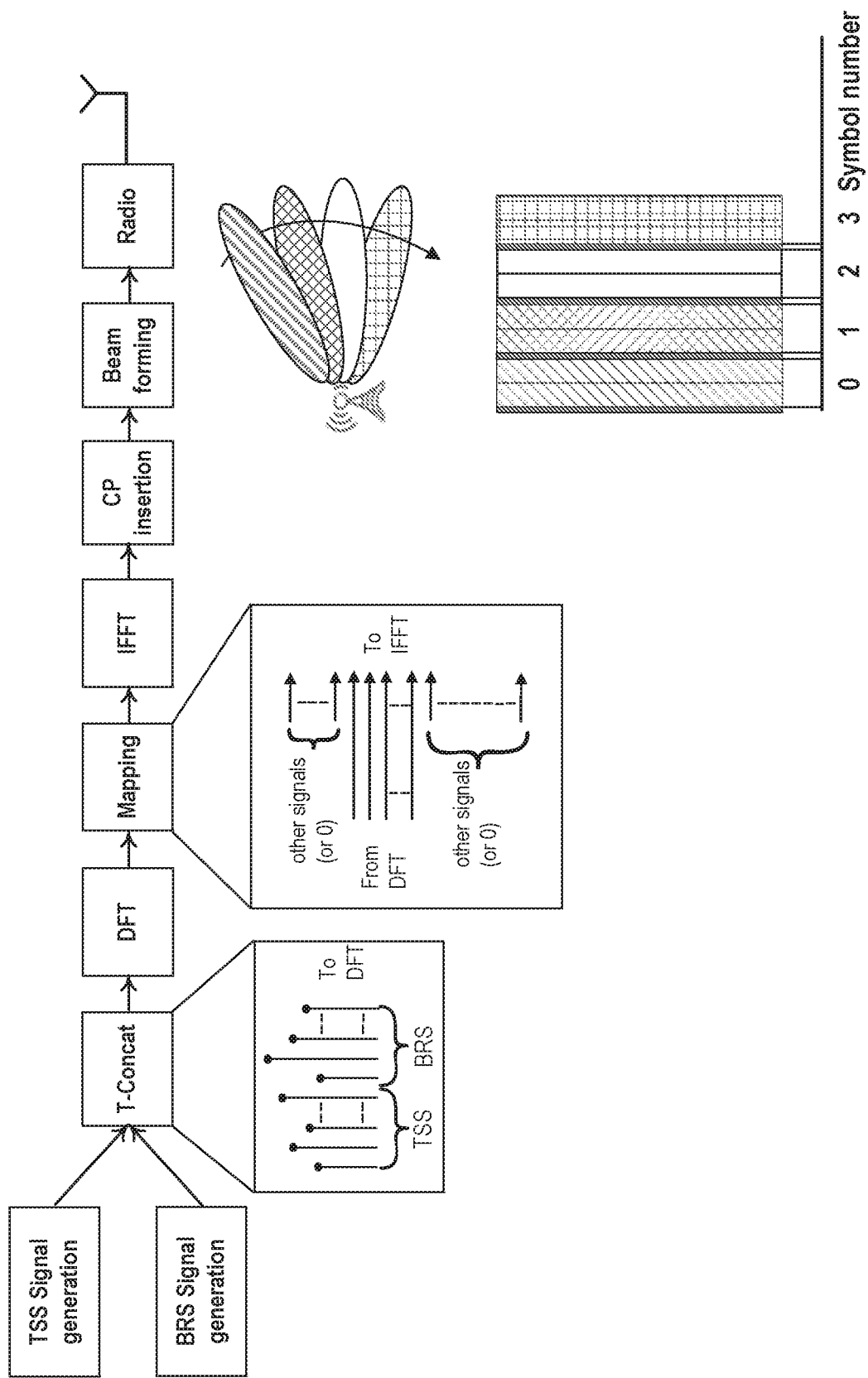
FIG. 4 illustrates the generation of a single MRS.
Figure 5:
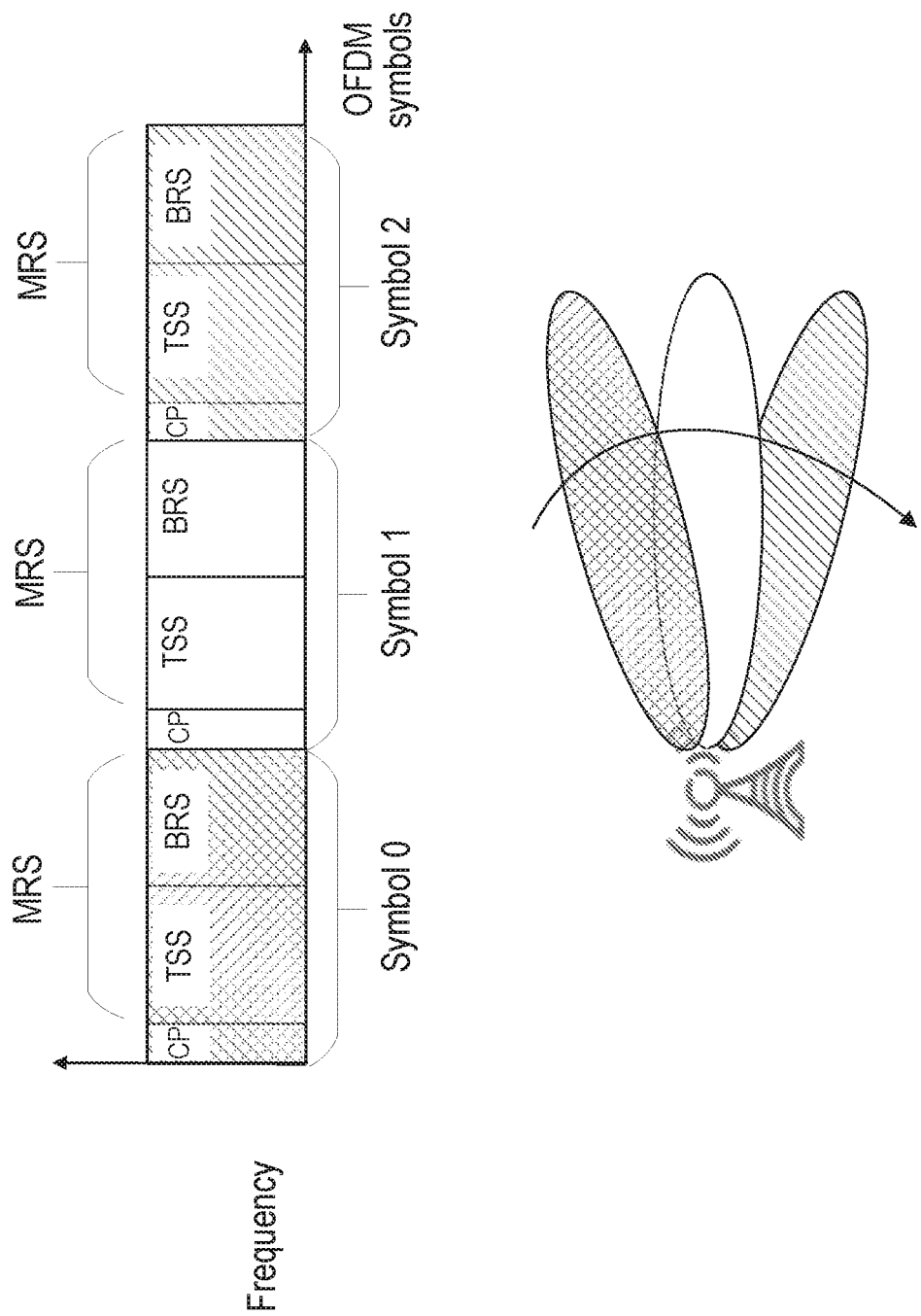
FIG. 5 illustrates an MRS design in time and frequency domains.
Figure 6:
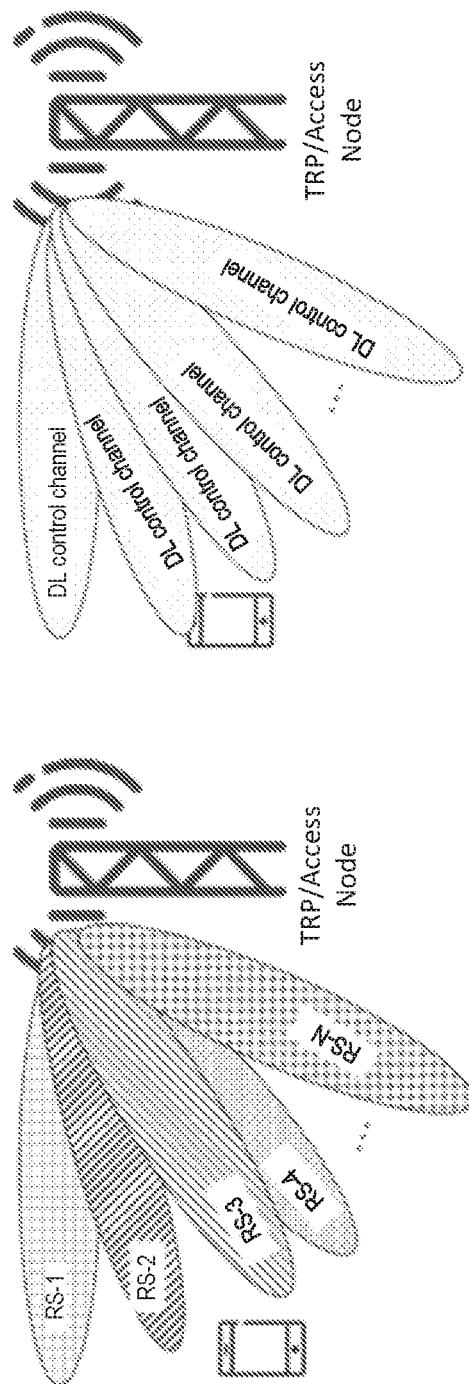
FIG. 6 illustrates the principles of a reference signal transmission that facilitates RLM procedures described herein, according to some embodiments.

FIG. 6 illustrates the principles of a reference signal transmission that facilitate the RLM procedures described herein. As seen on the left-hand side of FIG. 6, each beam carries RSs that are configured to the wireless device (e.g., UE) for mobility purposes. These reference signals are referred to as mobility reference signals or MRSs herein, though they may not necessarily carry that name. What is meant by "configured to the UE" is that a UE in RRC_CONNECTED mode is provided with information regarding measurements and reporting conditions, with respect to serving cell/beam signals and/or non-serving cell/beam signals. These RSs may carry a BID, a beam ID plus a group ID (which may be understood as a cell ID, for example), or simply a group ID, in various embodiments. As seen on the right-hand side of FIG. 6, a downlink control channel, e.g., a PDCCH, is transmitted using the same beamforming properties as the RSs that are used for mobility purposes. This may be understood as transmitting the downlink control channel in the "same beam" as the RSs, even if transmitted at different times. Note that the downlink control channel can carry (or be associated with) different RSs for channel estimation and channel decoding purposes. These can be, but are not necessarily, completely separate from the ones used for mobility, and may be cell-specific, UE-specific, and/or beam-specific, in various embodiments.

Given the approach shown in FIG. 6, it will be understood that RLM can be carried out on the MRSs, i.e., the RSs RS-1 to RS-N, since because the downlink control channel is beamformed in the same way as the MRSs, the measured quality of the MRSs will directly correspond to a quality of the downlink control channel. Thus, thresholds for in-sync and out-of-sync detection can be utilized in the same way as in LTE.

Another aspect of some embodiments of the presently disclosed techniques is that the network transmits these MRSs that are reused for RLM in frequency resources that are correlated with the frequency resources used for transmitting the DL control channel, so that the RS quality is both correlated in the directional domain (which may be referred to as the beam domain) and in the frequency domain, despite further time averaging that may occur. "Correlated in the frequency domain" here indicates that the frequency resources for the RSs are overlapping with or very close to those used for the downlink channel, within the overall possible bandwidth. By "reused" is meant that certain reference signals are used for mobility measurements, i.e., as MRSs, as well as for radio link monitoring (RLM).

Figure 7:
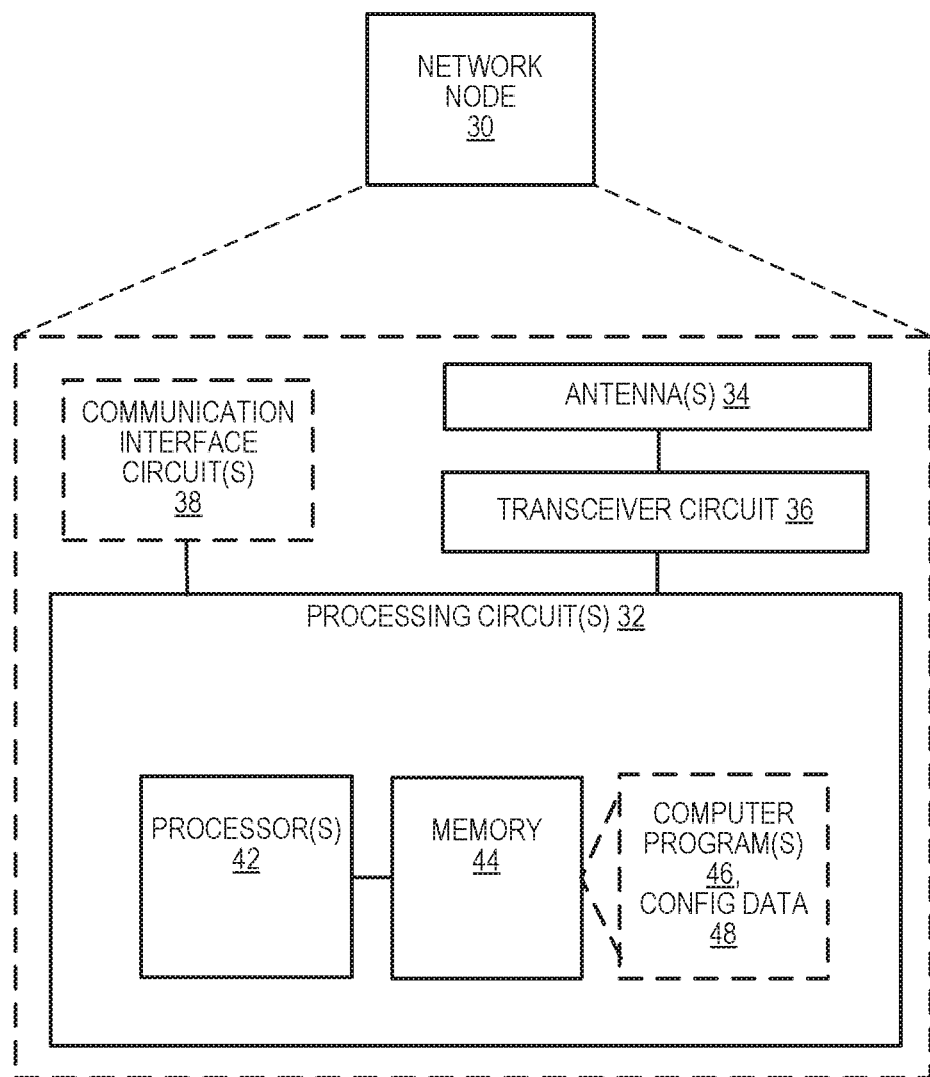
FIG. 7 is a block diagram of a network node, according to some embodiments.

FIG. 7 illustrates a diagram of a network node 30 that may be configured to carry out one or more of the disclosed techniques. The network node 30 can be any kind of network node that may include a network access node such as a base station, radio base station, base transceiver station, evolved Node B (eNodeB), Node B, or relay node. In the non-limiting embodiments described below, the network node 30 will be described as being configured to operate as a cellular network access node in an NR network.

Those skilled in the art will readily appreciate how each type of node may be adapted to carry out one or more of the methods and signaling processes described herein, e.g., through the modification of and/or addition of appropriate program instructions for execution by processing circuits 32.

The network node 30 facilitates communication between wireless terminals, other network access nodes and/or the core network. The network node 30 may include a communication interface circuit 38 that includes circuitry for communicating with other nodes in the core network, radio nodes, and/or other types of nodes in the network for the purposes of providing data and/or cellular communication services. The network node 30 communicates with UEs using antennas 34 and a transceiver circuit 36. The transceiver circuit 36 may include transmitter circuits, receiver circuits, and associated control circuits that are collectively configured to transmit and receive signals according to a radio access technology, for the purposes of providing cellular communication services.

The network node 30 also includes one or more processing circuits 32 that are operatively associated with the transceiver circuit 36 and, in some cases, the communication interface circuit 38. For ease of discussion, the one or more processing circuits 32 are referred to hereafter as "the processing circuit 32" or "the processing circuitry 32." The processing circuit 32 comprises one or more digital processors 42, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. More generally, the processing circuit 32 may comprise fixed circuitry, or programmable circuitry that is specially configured via the execution of program instructions implementing the functionality taught herein, or may comprise some mix of fixed and programmed circuitry. The processor 42 may be multi-core, i.e., having two or more processor cores utilized for enhanced performance, reduced power consumption, and more efficient simultaneous processing of multiple tasks.

The processing circuit 32 also includes a memory 44. The memory 44, in some embodiments, stores one or more computer programs 46 and, optionally, configuration data 48. The memory 44 provides non-transitory storage for the computer program 46 and it may comprise one or more types of computer-readable media, such as disk storage, solid-state memory storage, or any mix thereof. By way of non-limiting example, the memory 44 comprises any one or more of SRAM, DRAM, EEPROM, and FLASH memory, which may be in the processing circuit 32 and/or separate from the processing circuit 32, In general, the memory 44 comprises one or more types of computer-readable storage media providing non-transitory storage of the computer program 46 and any configuration data 48 used by the network access node 30. The processing circuit 32 may be configured, e.g., through the use of appropriate program code stored in memory 44, to carry out one or more of the methods and/or signaling processes detailed hereinafter.

The network node 30 is configured, according to some embodiments, to operate as an access node of a wireless communications system that provides for a UE to measure its serving cell quality where the cell is transmitting signals in a beamforming manner. The processing circuit 32 is configured to transmit, in a first downlink signal having a series of subframes, a beam-formed reference signal in each of a plurality of subframes, where the beam-formed reference signals are transmitted in fewer than all of the subframes of the downlink signal. The processing circuit 32 is configured to configure a UE to perform mobility management measurements using at least a first subset of the beam-formed reference signals and to perform radio link monitoring, RLM, using at least some of the first subset of beam-formed reference signals used for the mobility management measurements. Thus, these beam-formed reference signals may be referred to as MRSs. The processing circuit 32 may, in some embodiments, be configured to transmit a first control channel using the same beamforming parameters used to transmit the beam-formed reference signals.

Figure 8:
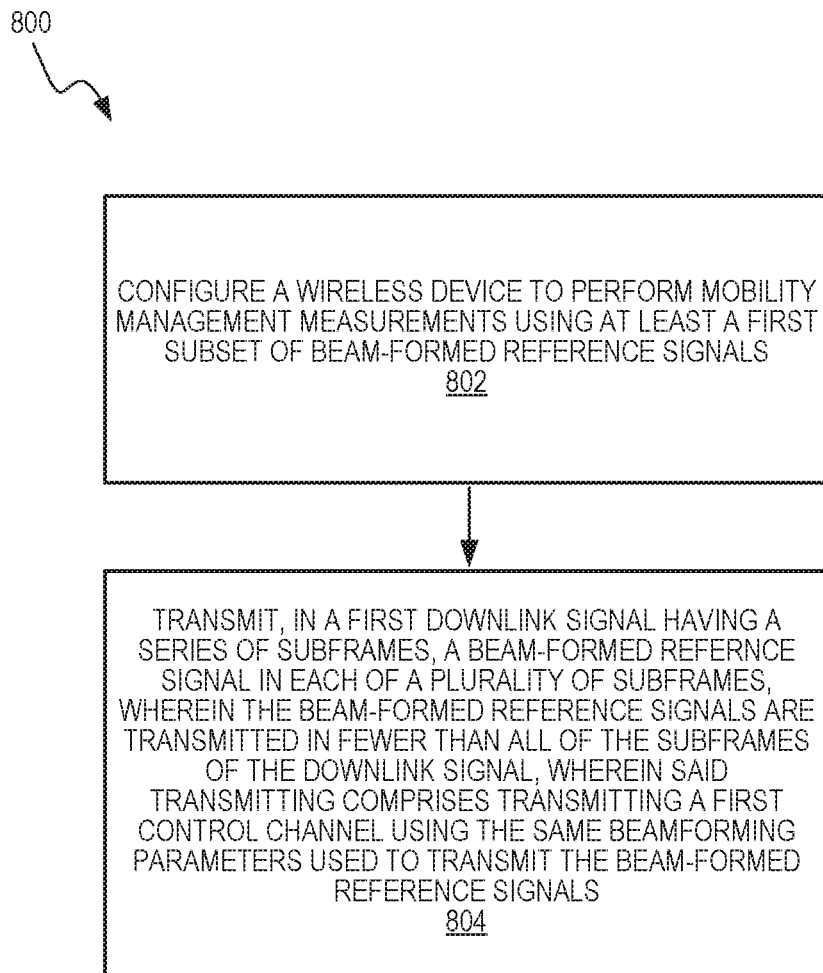
FIG. 8 illustrates a method in the network node, according to some embodiments.

Regardless of the physical implementation, the processing circuit 32 is configured to perform, according to some embodiments, a method 800 in an access node of a wireless communications system, as shown in FIG. 8. The method 800 includes transmitting, in a first downlink signal having a series of subframes, a beam-formed reference signal in each of a plurality of subframes, where the beam-formed reference signals are transmitted in fewer than all of the subframes of the downlink signal (block 804). The method also includes configuring a UE to perform mobility management measurements using at least a first subset of the beam-formed reference signals and to perform radio link monitoring, RLM, using at least some of the first subset of beam-formed reference signals used for the mobility management measurements (block 802). In some embodiments, the transmitting includes transmitting a first control channel using the same beamforming parameters used to transmit the beam-formed reference signals.

The method 800 may include transmitting one or more additional reference signals for use by the UE in estimating a channel for the first control channel and/or transmitting the first control channel in frequency resources at least partly overlapping frequency resources carrying the beam-formed reference signals. The beam-formed reference signals may include a beam-specific reference signal for a first beam. The beam-specific reference signal may carry a beam identifier, and the method 800 may include decoding the beam identifier from the beam-specific reference signal.

Another aspect of some embodiments is that the beam-formed reference signals are transmitted periodically and sparse in time, i.e., not in all subframes. However, the periodicity required for RLM may differ from the periodicity required for RRM measurements to trigger measurements reports. Therefore, in some embodiments the UE may only select some specific samples out of the transmitted RSs for RLM, where these sample/subframes are possibly configured by the network.

In some cases, for example, the UE is configured with a periodicity of beam-formed reference signals, and, based on a pre-defined RLM periodicity in the standards, it performs the RRM measurements for RLM. In other cases, the UE is informed of both periodicities, i.e., one periodicity where signals are transmitted and a periodicity to be used for RLM matching its DRX cycle.

Therefore, in some embodiments, the method 800 includes transmitting, to the UE, one or more configuration parameters defining a periodicity of the beam-formed reference signals used for radio link monitoring, RLM. The configuration parameters may directly specify a periodicity of the beam-formed reference signals to be used for mobility management measurements, such that the periodicity of the beam-formed reference signals used for RLM is determined from the periodicity of the beam-formed reference signals used for mobility management measurements.

Figure 9:
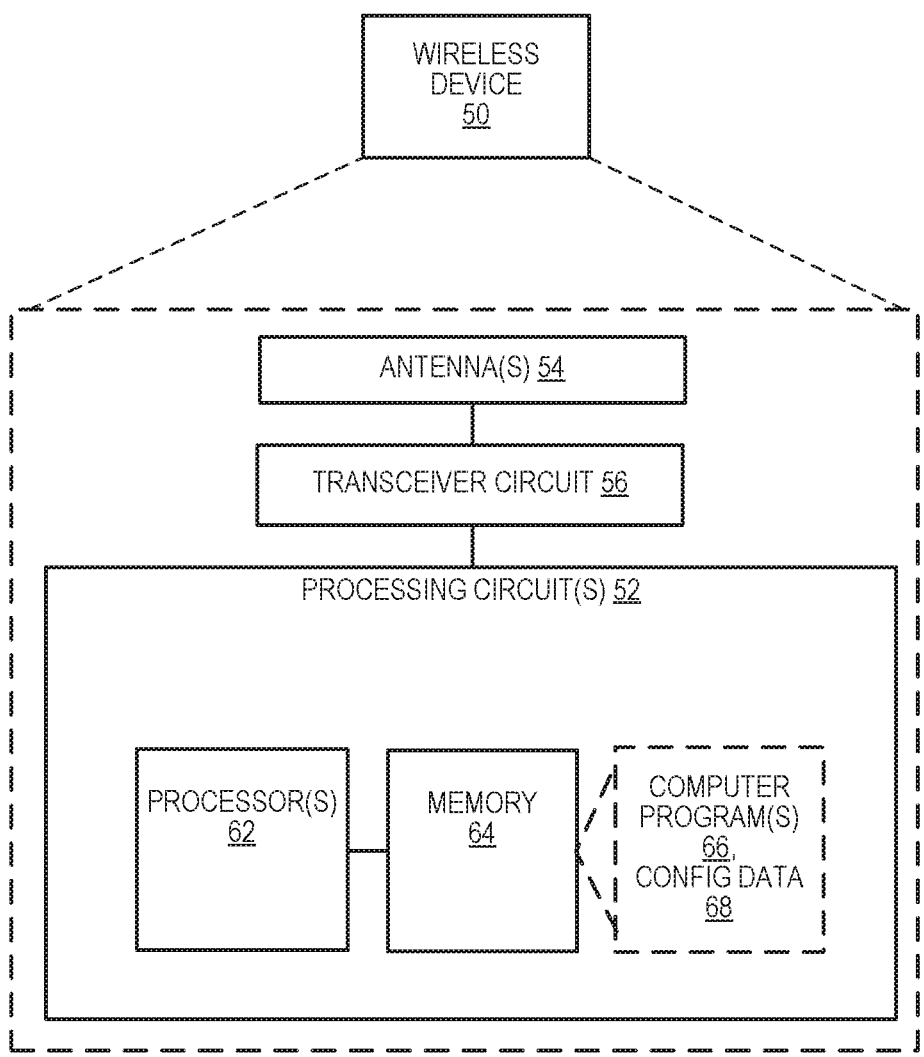
FIG. 9 is a block diagram of a UE, according to some embodiments.

FIG. 9 illustrates a diagram of the corresponding UE, shown as wireless device 50. The wireless device 50 may be considered to represent any wireless terminals that may operate in a network, such as a UE in a cellular network. Other examples may include a communication device, target device, device to device (D2D) UE, machine type UE or UE capable of machine to machine communication (M2M), a sensor equipped with UE, PDA (personal digital assistant), Tablet, mobile terminal, smart phone, laptop embedded equipped (LEE), laptop mounted equipment (LME), USB dongles, Customer Premises Equipment (CPE), etc.

The wireless device 50 is configured to communicate with a radio node or base station in a wide-area cellular network via antennas 54 and a transceiver circuit 56. The transceiver circuit 56 may include transmitter circuits, receiver circuits, and associated control circuits that are collectively configured to transmit and receive signals according to a radio access technology, for the purposes of using cellular communication services. This radio access technology is NR for the purposes of this discussion.

The wireless device 50 also includes one or more processing circuits 52 that are operatively associated with the radio transceiver circuit 56. The processing circuit 52 comprises one or more digital processing circuits, e.g., one or more microprocessors, microcontrollers, DSPs, FPGAs, CPLDs, ASICs, or any mix thereof. More generally, the processing circuit 52 may comprise fixed circuitry, or programmable circuitry that is specially adapted via the execution of program instructions implementing the functionality taught herein, or may comprise some mix of fixed and programmed circuitry. The processing circuit 52 may be multi-core.

The processing circuit 52 also includes a memory 64. The memory 64, in some embodiments, stores one or more computer programs 66 and, optionally, configuration data 68. The memory 64 provides non-transitory storage for the computer program 66 and it may comprise one or more types of computer-readable media, such as disk storage, solid-state memory storage, or any mix thereof. Here, "non-transitory" means permanent, semi-permanent, or at least temporarily persistent storage and encompasses both long-term storage in non-volatile memory and storage in working memory, e.g., for program execution. By way of non-limiting example, the memory 64 comprises any one or more of SRAM, DRAM, EEPROM, and FLASH memory, which may be in the processing circuit 52 and/or separate from processing circuit 52. In general, the memory 64 comprises one or more types of computer-readable storage media providing non-transitory storage of the computer program 66 and any configuration data 68 used by the user equipment 50. The processing circuit 52 may be configured, e.g., through the use of appropriate program code stored in memory 64, to carry out one or more of the methods and/or signaling processes detailed hereinafter.

The wireless device 50 is configured, according to some embodiments, to measure a serving cell quality where the cell is transmitting signals in a beamforming manner.

Accordingly, the processing circuit 52 is configured to receive, in a downlink signal having a series of subframes, a beam-formed reference signal in each of a plurality of subframes, where the beam-formed reference signals are received in fewer than all of the subframes of the downlink signal. The processing circuit 52 is also configured to perform mobility management measurements using at least a first subset of the received beam-formed reference signals and perform RLM using at least some of the first subset of beam-formed reference signals used for the mobility management measurements.

According to some embodiments, the processing circuit 52 performs a method 1000 that includes receiving, in a downlink signal having a series of subframes, a beam-formed reference signal in each of a plurality of subframes, where the beam-formed reference signals are received in fewer than all of the subframes of the downlink signal (block 1002). The method 1000 also includes performing mobility management measurements using at least a first subset of the received beam-formed reference signals (block 1004) and performing RLM using at least some of the first subset of beam-formed reference signals used for the mobility management measurements (block 1006).

In some cases, performing RLM includes performing one or more measurements using the at least some of the first subset of beam-formed reference signals to obtain a radio signal metric, and comparing the radio signal metric to a threshold that represents a predetermined downlink control channel quality, given an assumption that a hypothetical control channel corresponding to the predetermined control channel quality is transmitted using the same beamforming properties applied to the beam-formed reference signals. The method 1000 may also include demodulating a first control channel using one or more additional reference signals to estimate a channel for the first control channel. The first control channel may be received in frequency resources at least partly overlapping frequency resources carrying the beam-formed reference signals used for performing RLM.

Performing RLM may also include determining that the UE is in-sync or out-of-sync, based on measurements of the at least some of the first subset of beam-formed reference signals.

According to some embodiments, the method 1000 includes performing mobility management measurements using the first subset of the received beam-formed reference signals by measuring a signal quality for a first beam, using one or more of the first subset of the received beam-formed reference signals, and measuring a signal quality for a second beam, using one or more different ones of the first subset of the received beam-formed reference signals.

At least some of the first subset of beam-formed reference signals may include a beam-specific reference signal for a first beam, and performing RLM may include performing RLM for the first beam, using the beam-specific reference signal. The beam-specific reference signal may carry a beam identifier, and the method 1000 may include decoding the beam identifier from the beam-specific reference signal.

In some cases, the method 1000 includes receiving, prior to performing said RLM, one or more configuration parameters defining a periodicity of the beam-formed reference signals used for RLM. The configuration parameters may directly specify a periodicity of the beam-formed reference signals used for mobility management measurements, and the periodicity of the beam-formed reference signals used for RLM may be determined from the periodicity of the beam-formed reference signals used for mobility management measurements.

Figure 11:
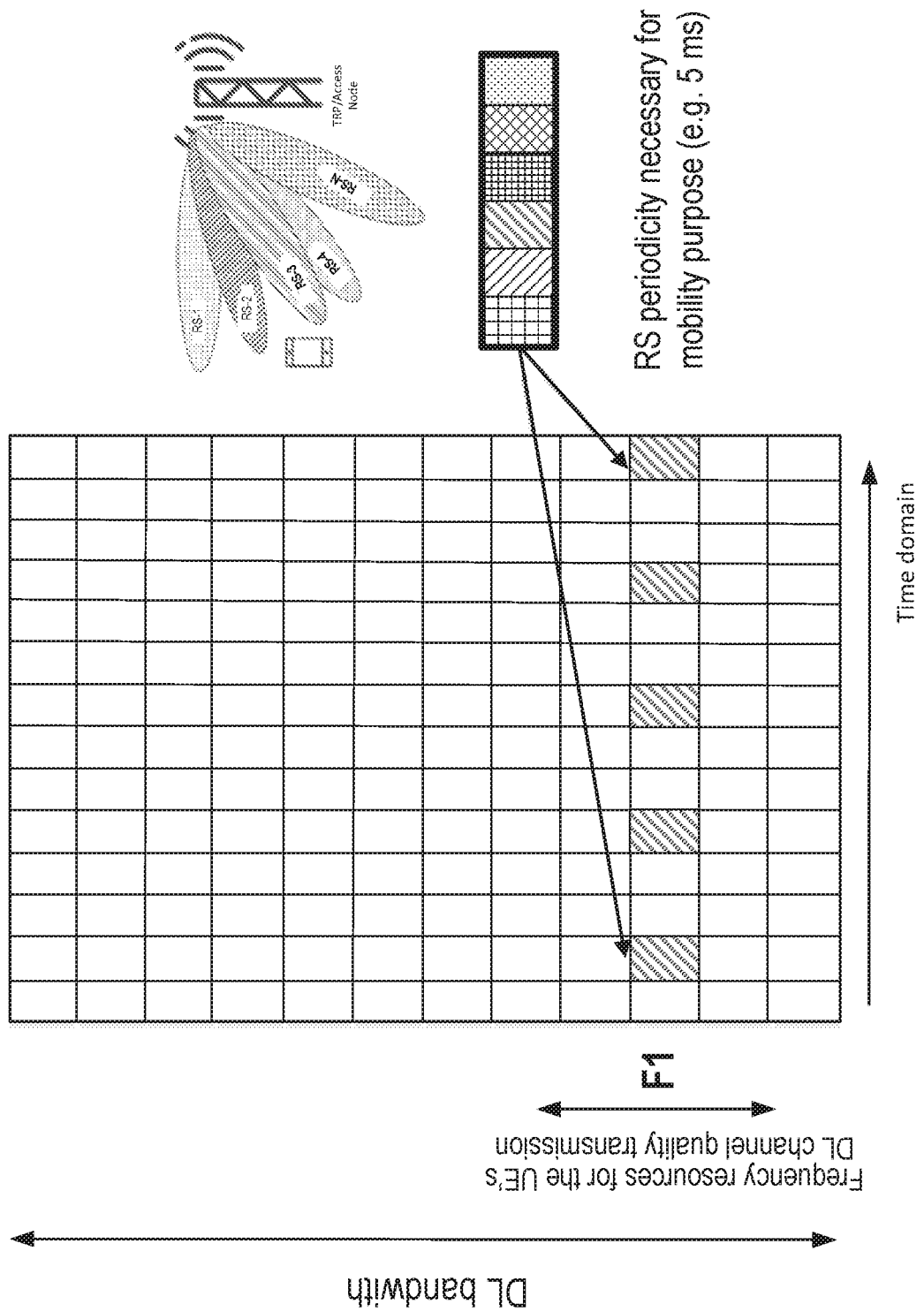
FIG. 11 is a diagram illustrating that RSs used for mobility can be transmitted on six adjacent PRBs in every fifth subframe, according to some embodiments.
Figure 12:
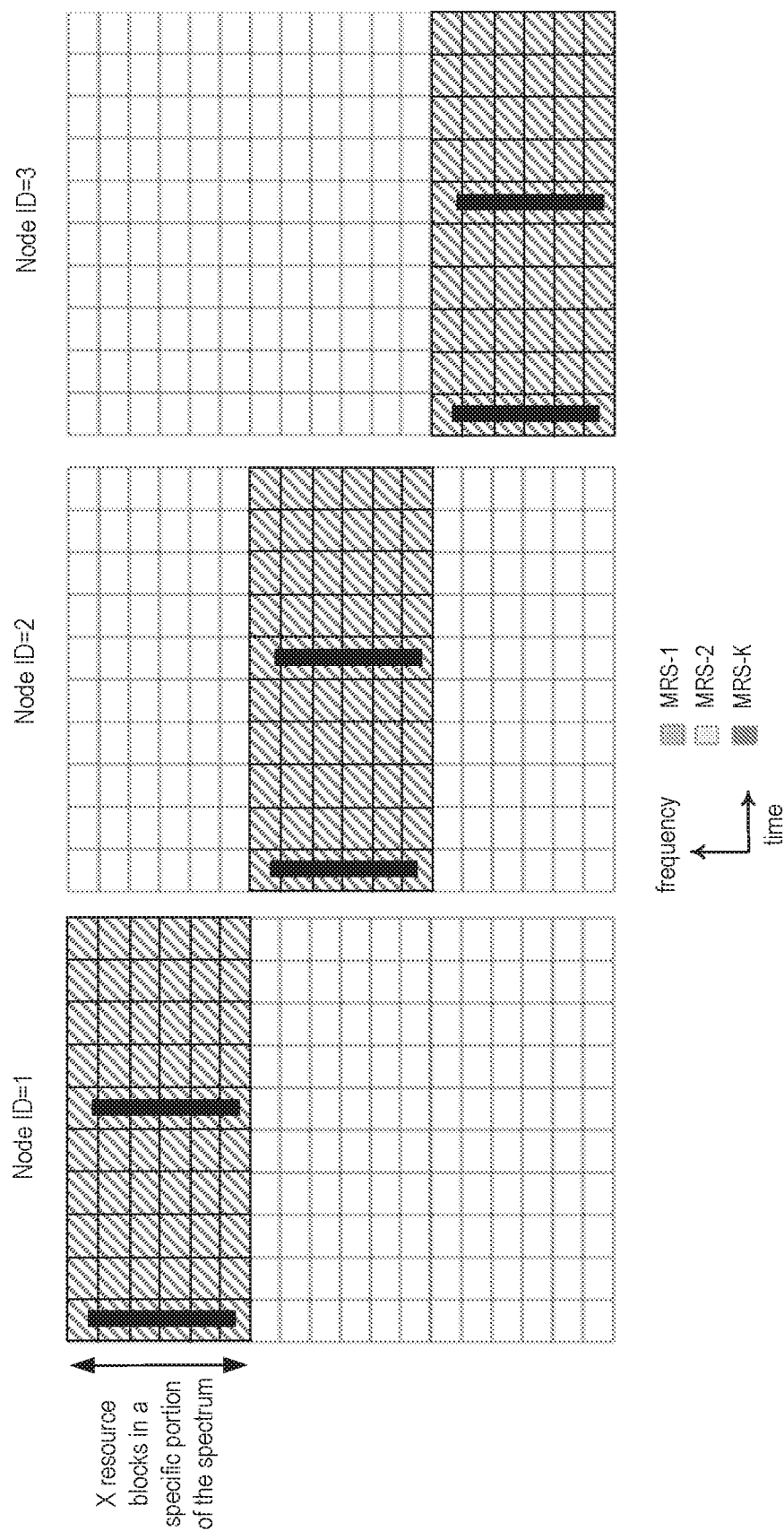
FIG. 12 is a diagram illustrating that the configuration of six different physical resource block (PRB) allocations for the serving MRS set can be different for different access nodes and matched to different access node IDs, according to some embodiments.

As seen in the example configuration shown in FIG. 11, the transmission of the RSs used for mobility can be configured sparsely for RRM and synchronization functions, in the time and frequency domains, to match the DL control channel quality. For example, the RSs used for mobility, i.e., the MRSs, can be transmitted on six adjacent PRBs in every fifth subframe, as illustrated in FIG. 11. The configuration of different six PRB allocations for the serving MRS set can be different for different access nodes, and matched to different access node IDs, in some embodiments, as shown in FIG. 12. In this example, three different access nodes or serving cells have node identifiers Node ID-1, Node ID-2, etc., and utilize different sets of PRB allocations for the MRS, where the particular allocations may be derivable from the node identifiers. These may make up a configured MRS set for mobility measurements for a given UE, for example. Note that this quantity of time-frequency resource allocations for the serving MRS set is comparable to the LTE PSS/SSS, which are both transmitted on six PRBs in every fifth subframe. Of course, different periodicities are possible, as are different sized configurations in the frequency domain.

However, such time-frequency resource granularity of MRSs in the serving MRS set is not as abundant as the PDCCH occasions on the resource grid. The number of measurement samples during the RLM procedure should be sufficient and the samples should be taken on many subcarriers throughout the downlink transmission bandwidth. The reconfiguration for the subcarrier allocation of serving MRS set can be based on a localized or a distributed scheme for the DL control channels. A localized scheme may require fewer UE computations, whereas a distributed scheme may provide better accuracy in frequency-selective channels.

The use of periodic RSs of an MRS set for the RLM function is a solution with minimal signaling burden on the network radio resources since the these MRSs are already provided by the network for mobility measurements and synchronization purposes.

The techniques described herein provide a configurable and dynamic method to perform reference signal measurements for the RLM function at UEs, without violating the lean signaling principles of 3GPP 5G NR. An important advantage enabled by these techniques is an improved efficiency at which the network can flexibly configure a limited number of sparse reference signals for different deployment (e.g., number of beams) and traffic (e.g., number of users, data activity/inactivity) scenarios.

Figure 10:
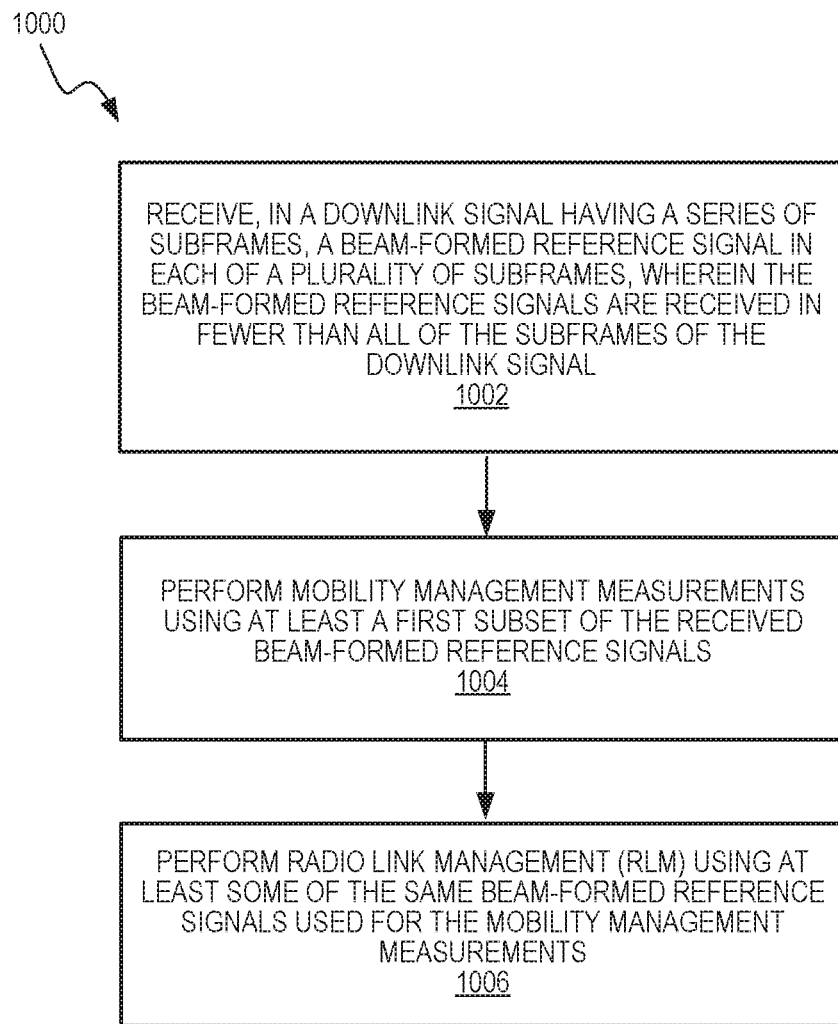
FIG. 10 illustrates a method in the UE, according to some embodiments.

As discussed in detail above, the techniques described herein, e.g., as illustrated in the process flow diagrams of FIGS. 8 and 10, may be implemented, in whole or in part, using computer program instructions executed by one or more processors. It will be appreciated that a functional implementation of these techniques may be represented in terms of functional modules, where each functional module corresponds to a functional unit of software executing in an appropriate processor or to a functional digital hardware circuit, or some combination of both.

Figure 13:
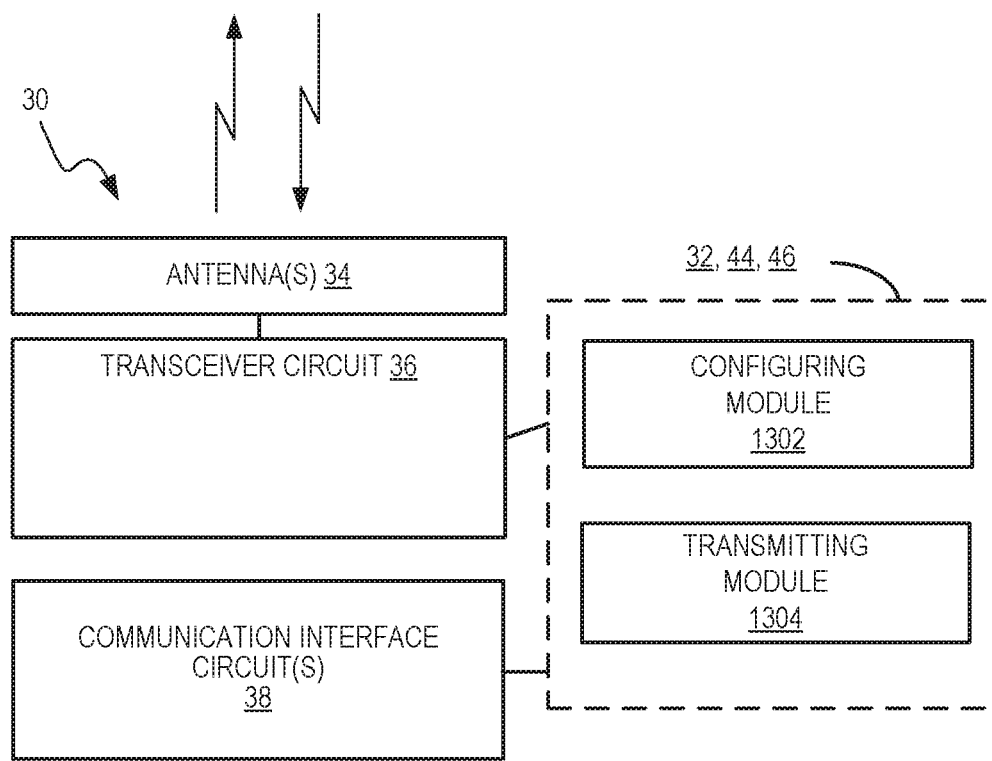
FIG. 13 is a block diagram illustrating a functional implementation of a network node, according to some embodiments.

FIG. 13 illustrates an example functional module or circuit architecture as may be implemented in an access node of a wireless communication network, such as in network node 30. The functional implementation includes a transmitting module 1304 for transmitting, in a first downlink signal having a series of subframes, a beam-formed reference signal in each of a plurality of subframes, where the beam-formed reference signals are transmitted in fewer than all of the subframes of the downlink signal. The implementation also includes a configuring module 1302 for configuring a UE to perform mobility management measurements using at least a first subset of the beam-formed reference signals and to perform radio link monitoring, RLM, using at least some of the first subset of beam-formed reference signals used for the mobility management measurements. The transmitting may, in some embodiments, comprise transmitting a first control channel using the same beamforming parameters used to transmit the beam-formed reference signals.

Figure 14:
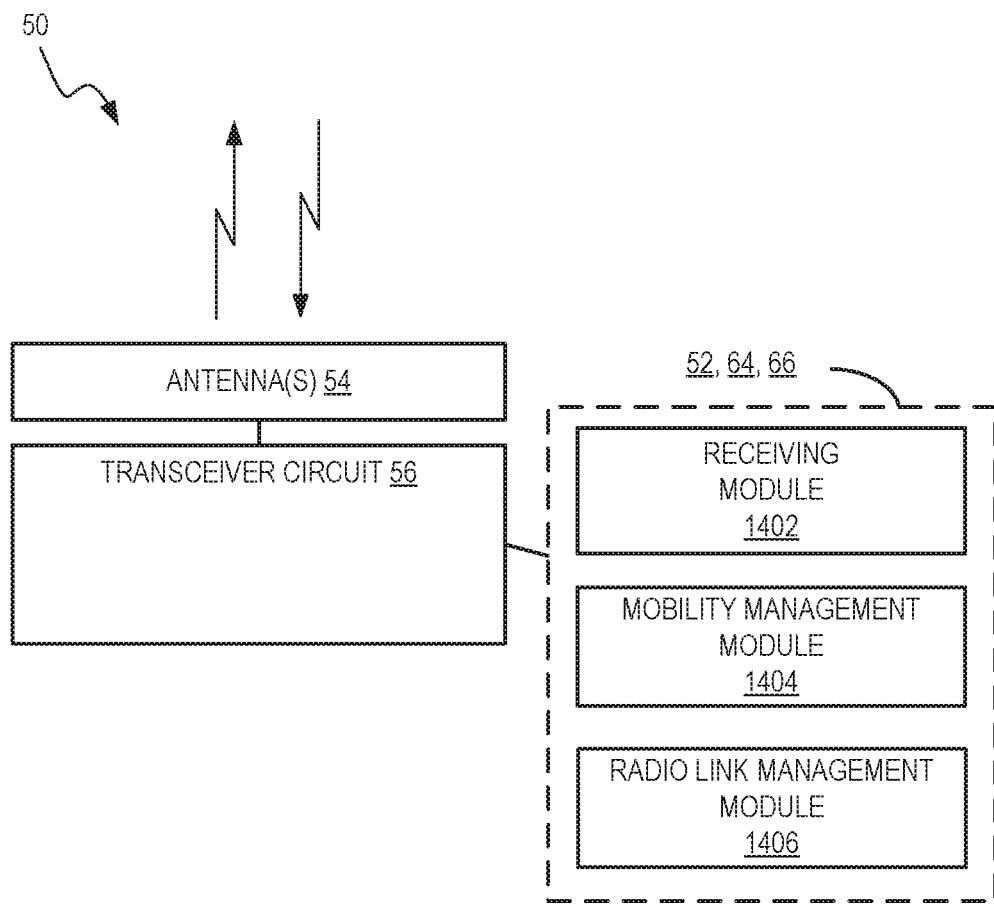
FIG. 14 is a block diagram illustrating a functional implementation of a UE, according to some embodiments.

FIG. 14 illustrates an example functional module or circuit architecture as may be implemented in a wireless device 50 adapted for operation in a wireless communication network. The implementation includes a receiving module 1402 for receiving, in a downlink signal having a series of subframes, a beam-formed reference signal in each of a plurality of subframes, where the beam-formed reference signals are received in fewer than all of the subframes of the downlink signal. The implementation also includes a mobility management module 1404 for performing mobility management measurements using at least a first subset of the received beam-formed reference signals and a radio link monitoring module 1406 for performing radio link monitoring, RLM, using at least some of the first subset of beam-formed reference signals used for the mobility management measurements.

The present invention may, of course, be carried out in other ways than those specifically set forth herein without departing from essential characteristics of the invention. The present embodiments are to be considered in all respects as illustrative and not restrictive.

The invention claimed is:

1. A method, in a user equipment (UE), the method comprising:
   receiving, in a downlink signal having a series of subframes, a beam-formed reference signal in each of a plurality of subframes, wherein the beam-formed reference signals are received in fewer than all of the subframes of the downlink signal;
   performing mobility management measurements using at least a first subset of the received beam-formed reference signals; and
   performing radio link monitoring (RLM) using at least some of the first subset of beam-formed reference signals used for the mobility management measurements.

2. A method, in an access node of a wireless communications system, the method comprising:
   transmitting, in a first downlink signal having a series of subframes, a beam-formed reference signal in each of a plurality of subframes, wherein the beam-formed reference signals are transmitted in fewer than all of the subframes of the downlink signal; and
   configuring a user equipment (UE) to perform mobility management measurements using at least a first subset of the beam-formed reference signals and to perform radio link monitoring (RLM) using at least some of the first subset of beam-formed reference signals used for the mobility management measurements.

3. A user equipment (UE) configured for operation in a wireless communication network, the UE comprising:
   transceiver circuitry; and
   processing circuitry operatively associated with the transceiver circuitry and configured to:
   receive, using the transceiver circuitry, in a downlink signal having a series of subframes, a beam-formed reference signal in each of a plurality of subframes, such that the beam-formed reference signals are received in fewer than all of the subframes of the downlink signal;
   perform mobility management measurements using at least a first subset of the received beam-formed reference signals; and
   perform radio link monitoring (RLM) using at least some of the first subset of beam-formed reference signals used for the mobility management measurements.

4. The UE of claim 3, wherein the processing circuitry is configured to perform RLM by performing one or more measurements using the at least some of the first subset of beam-formed reference signals to obtain a radio signal metric, and comparing the radio signal metric to a threshold that represents a predetermined downlink control channel quality, given an assumption that a hypothetical control channel corresponding to the predetermined control channel quality is transmitted using the same beamforming properties applied to the beam-formed reference signals.

5. The UE of claim 4, wherein the processing circuitry is configured to demodulate a first control channel using one or more additional reference signals to estimate a channel for the first control channel.

6. The UE of claim 5, wherein the first control channel is received in frequency resources at least partly overlapping frequency resources carrying the beam-formed reference signals used for performing RLM.

7. The UE of claim 3, wherein the processing circuitry is configured to perform RLM by determining that the UE is in-sync or out-of-sync, based on measurements of the at least some of the first subset of beam-formed reference signals.

8. The UE of claim 3, wherein the processing circuitry is configured to perform mobility management measurements using the first subset of the received beam-formed reference signals by measuring a signal quality for a first beam, using one or more of the first subset of the received beam-formed reference signals, and measuring a signal quality for a second beam, using one or more different ones of the first subset of the received beam-formed reference signals.

9. The UE of claim 3, wherein the at least some of the first subset of beam-formed reference signals comprise a beam-specific reference signal for a first beam, and wherein the processing circuitry is configured to perform RLM by performing RLM for the first beam, using the beam-specific reference signal.

10. The UE of claim 9, wherein the beam-specific reference signal carries a beam identifier, and wherein the processing circuitry is configured to decode the beam identifier from the beam-specific reference signal.

11. The UE of claim 3, wherein the processing circuitry is configured to receive, prior to performing said RLM, one or more configuration parameters defining a periodicity of the beam-formed reference signals used for RLM.

12. The UE of claim 11, wherein the one or more configuration parameters directly specify a periodicity of the beam-formed reference signals used for mobility management measurements, and wherein the periodicity of the beam-formed reference signals used for RLM is determined from the periodicity of the beam-formed reference signals used for mobility management measurements.

13. An access node of a wireless communications system, comprising:
   transceiver circuitry; and processing circuitry operatively associated with the transceiver circuitry and configured to:
  transmit, using the transceiver circuitry, in a first downlink signal having a series of subframes, a beam-formed reference signal in each of a plurality of subframes, wherein the beam-formed reference signals are transmitted in fewer than all of the subframes of the downlink signal; and
  configure a user equipment (UE) to perform mobility management measurements using at least a first subset of the beam-formed reference signals and to perform radio link monitoring (RLM) using at least some of the first subset of beam-formed reference signals used for the mobility management measurements.

14. The access node of claim 13, wherein the processing circuitry is configured to transmit one or more additional reference signals for use by the UE in estimating a channel for a first control channel.

15. The access node of claim 13, wherein the processing circuitry is configured to transmit the first control channel in frequency resources at least partly overlapping frequency resources carrying the beam-formed reference signals.

16. The access node of claim 13, wherein one or more of the beam-formed reference signals comprises a beam-specific reference signal for a first beam.

17. The access node of claim 16, wherein the beam-specific reference signal carries a beam identifier, and wherein the processing circuitry is configured to decode the beam identifier from the beam-specific reference signal.

18. The access node of claim 13, wherein the processing circuitry is configured to transmit, to the UE, one or more configuration parameters defining a periodicity of the beam-formed reference signals used for radio link monitoring, RLM.

19. The access node of claim 18, wherein the one or more configuration parameters directly specify a periodicity of the beam-formed reference signals to be used for mobility management measurements, such that the periodicity of the beam-formed reference signals used for RLM is determined from the periodicity of the beam-formed reference signals used for mobility management measurements.

20. A non-transitory computer readable storage medium storing a computer program comprising program instructions that, when executed on at least one processing circuit of a UE configured for operation in a wireless communication network, configures the UE to:
  receive, in a downlink signal having a series of subframes, a beam-formed reference signal in each of a plurality of subframes, wherein the beam-formed reference signals are received in fewer than all of the subframes of the downlink signal;
  perform mobility management measurements using at least a first subset of the received beam-formed reference signals; and
  perform radio link monitoring (RLM) using at least some of the first subset of beam-formed reference signals used for the mobility management measurements.

21. A non-transitory computer readable storage medium storing a computer program comprising program instructions that, when executed on at least one processing circuit of an access node of a wireless communication network, configures the access node to:
  transmit, in a first downlink signal having a series of subframes, a beam-formed reference signal in each of a plurality of subframes, wherein the beam-formed reference signals are transmitted in fewer than all of the subframes of the downlink signal; and
  configure a UE to perform mobility management measurements using at least a first subset of the beam-formed reference signals and to perform radio link monitoring (RLM) using at least some of the first subset of beam-formed reference signals used for the mobility management measurements.

* * * * *